(12) United States Patent
Chronister et al.

(10) Patent No.: US 10,958,028 B1
(45) Date of Patent: Mar. 23, 2021

(54) PLUG RETAINING CRADLE INCLUDING A SABOT

(71) Applicants: Chronister Investments, LLC, El Reno, OK (US); SIMPLE Innovations, LLC, El Reno, OK (US)

(72) Inventors: Justin T. Chronister, El Reno, OK (US); Joshua R. Maddox, Mustang, OK (US); Steve R. Maddox, El Reno, OK (US)

( * ) Notice: Subject to any disclaimer, the term of this patent is extended or adjusted under 35 U.S.C. 154(b) by 0 days.

(21) Appl. No.: 16/793,884

(22) Filed: Feb. 18, 2020

(51) Int. Cl.
*H01R 13/639* (2006.01)
*H01R 33/90* (2006.01)
*H02J 7/00* (2006.01)
*H02J 7/02* (2016.01)

(52) U.S. Cl.
CPC ......... *H01R 33/90* (2013.01); *H01R 13/6395* (2013.01); *H02J 7/0029* (2013.01); *H02J 7/02* (2013.01)

(58) Field of Classification Search
CPC .... H01R 13/6395; H01R 13/73; H01R 24/46; H01R 25/006
See application file for complete search history.

(56) References Cited

U.S. PATENT DOCUMENTS

| 3,601,757 | A | * | 8/1971 | Gober | H01R 13/6395 439/147 |
| 4,851,612 | A | * | 7/1989 | Peckham | H01R 13/6395 174/67 |
| 7,638,710 | B1 | * | 12/2009 | Vance | H01R 13/6395 174/135 |

* cited by examiner

*Primary Examiner* — Vanessa Girardi
(74) *Attorney, Agent, or Firm* — Michael L. Greenberg, Esq.; Greenberg & Lieberman, LLC

(57) ABSTRACT

A charger guard apparatus is described. The guard is equipped with a sabot, wall plate, and retaining cradle which, when assembled around a mobile device charger or any AC-powered male plug, is configured to prevent unwanted movement, damage, or loss to the charger or similar AC-powered device. The sabot is preferably composed of a top half and a bottom half which are configured to lock together around a male AC plug, including any AC/DC adapter or similar plug protrusion. The sabot is also configured to encapsulate any and all cable extending from an AC/DC adapter disposed within the sabot. The retaining cradle is configured to lock to the wall plate via retaining clips which are designed to mate with clip sockets of the wall plate.

14 Claims, 7 Drawing Sheets

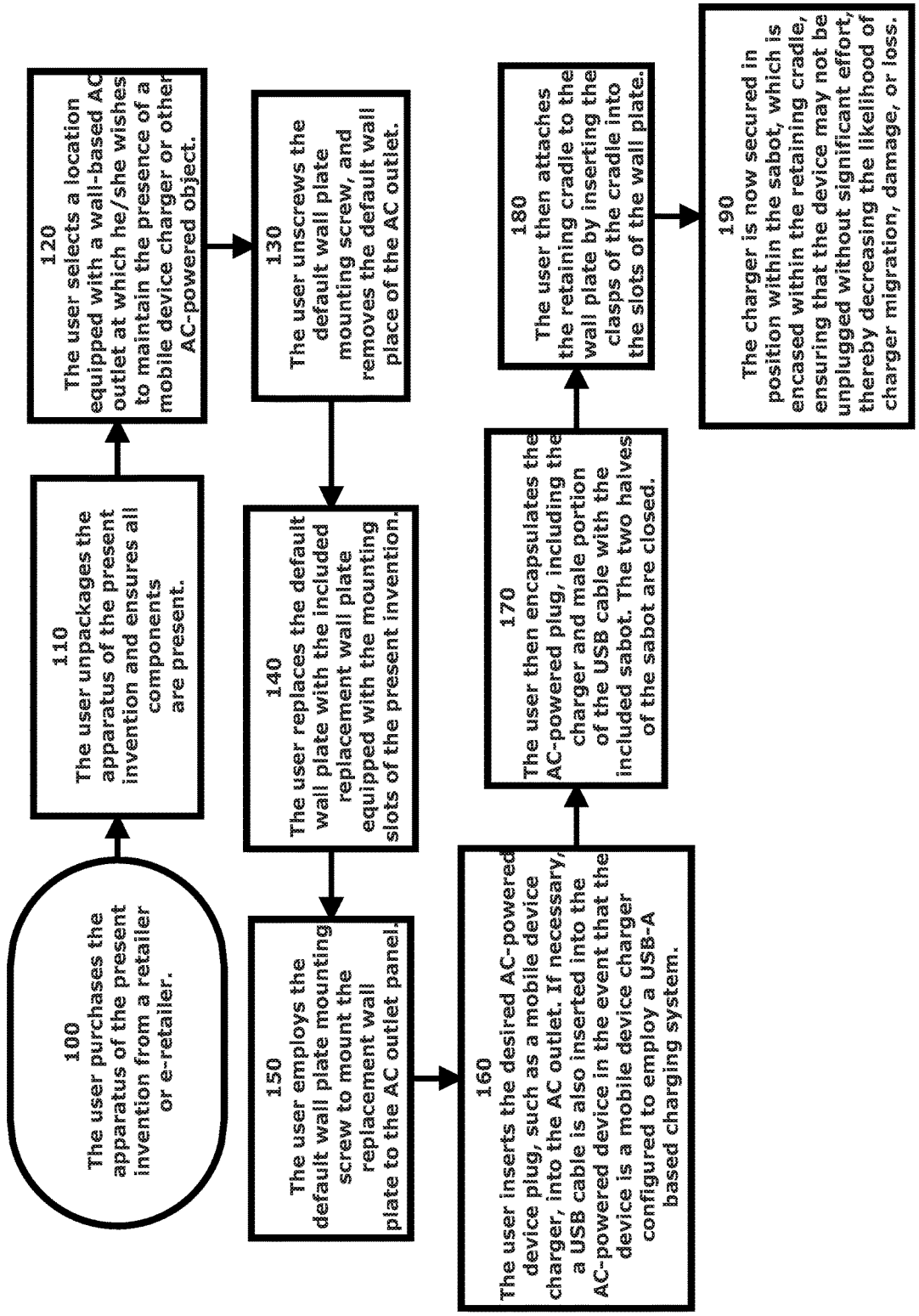

PLUG RETAINING CRADLE INCLUDING A SABOT

FIELD OF THE PRESENT INVENTION

The present invention relates to the field of electronic devices and their respective charging mechanisms, and more specifically relates to an apparatus and system configured to guard the male AC charging adapter while plugged into an electrical outlet, and to furthermore prevent removal of any and all subsequent male or female cables disposed in communication with the male AC charging adapter.

BACKGROUND OF THE PRESENT INVENTION

The market for mobile device charging devices reached $5.22 billion in 2017, and is projected to grow up to $71.21 billion by the year 2025. As the populace continues to depend on handheld, battery-powered mobile device technology more, it can be anticipated that a correlative growth shall occur in the market for devices configured to charge the batteries of these mobile devices. Additionally, it can easily be imagined that the number of chargers sold is greater than the number of handheld mobile devices sold.

The additional charging devices in comparison to the number of mobile devices may be explained as due to several factors, including, but not limited to: wear-and-tear, users wishing to own multiple chargers for a single device to facilitate ease of charging the device in multiple locations, lost chargers, and other similar factors. Parents of children which regularly employ mobile devices, be it for education or entertainment, are often prone to encounter scenarios in which the charger has been damaged, lost, or misplaced. It is known that children will move a charger to suit their desired location and needs, often much to the dismay of the parent's request. Unfortunately, this child-induced charger migration and mismanagement leads many parents to require the purchase of additional or replacement chargers in order to ensure their own devices may maintain a usable battery level.

However, if there were a way in which a parent or guardian could lock a charger to a specific outlet and location so as to prevent migration of the charger (both the AC/DC adapter and conventional USB charging cable), fewer chargers would be lost, damaged, or stolen. Additionally, users would have fewer reasons to need to purchase replacement chargers.

Thus, there is a need for a charger protection and locking device configured to ensure that the charger, including the USB-A based male cable, as well as the AC/DC adapter portion, remain in and at the desired power outlet. Such a protection device is preferably configured to encapsulate the entirety of the male AC charging adapter, as well as the end of the charging cable itself, ensuring that both remain together, and in the desired location for use.

Of the prior art found, a similar product was found on Amazon™ by Dreambaby, titled the "Dreambaby Dual Fit Plug and Electrical 2-Piece Outlet Cover," as shown here: https://www.amazon.com/Dreambaby-Electrical-2-Piece-Outlet-Cover/dp/B07CL2Z1XM?th=1 While the product accomplishes a similar function to that of the present invention, it is fundamentally different in both the design, as well as in the way in which the cable is routed. Additionally, the Dreambaby product does not include any means by which a cage attaches to a replacement outlet wall plate cover, and appears more suitable for standard outlet cabling rather than tailored for AC/DC adapter blocks conventionally used in the charging of mobile devices such as mobile phones and tablet computers.

SUMMARY OF THE PRESENT INVENTION

The present invention is a charger guard and protection apparatus configured to ensure that a mobile device charging apparatus, referenced as a "charger" remains in a static location, within an AC power outlet, for use. The present invention is configured to reduce the risk of damage, loss, and misplacement of the charger and adapter. As a solution to the problem, the present invention includes a retaining cradle configured to limit a person's ability to remove wall charger(s) and charging cord(s) by physically anchoring both to the wall AC outlet. In addition to securing wall chargers and cords, the present invention has the capability of securing the cords of ordinary devices to the wall for both security and the prevention of an accidental disconnection. The retaining device also has the capability of securing HDMI and CAT 5 cables.

The following brief and detailed descriptions of the drawings are provided to explain possible embodiments of the present invention but are not provided to limit the scope of the present invention as expressed herein this summary section.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

The present invention will be better understood with reference to the appended drawing sheets, wherein:

FIG. 7 shows a flow chart detailing the process of installation and use of the present invention by a user.

DETAILED DESCRIPTION OF THE PREFERRED EMBODIMENT

Figure 1:
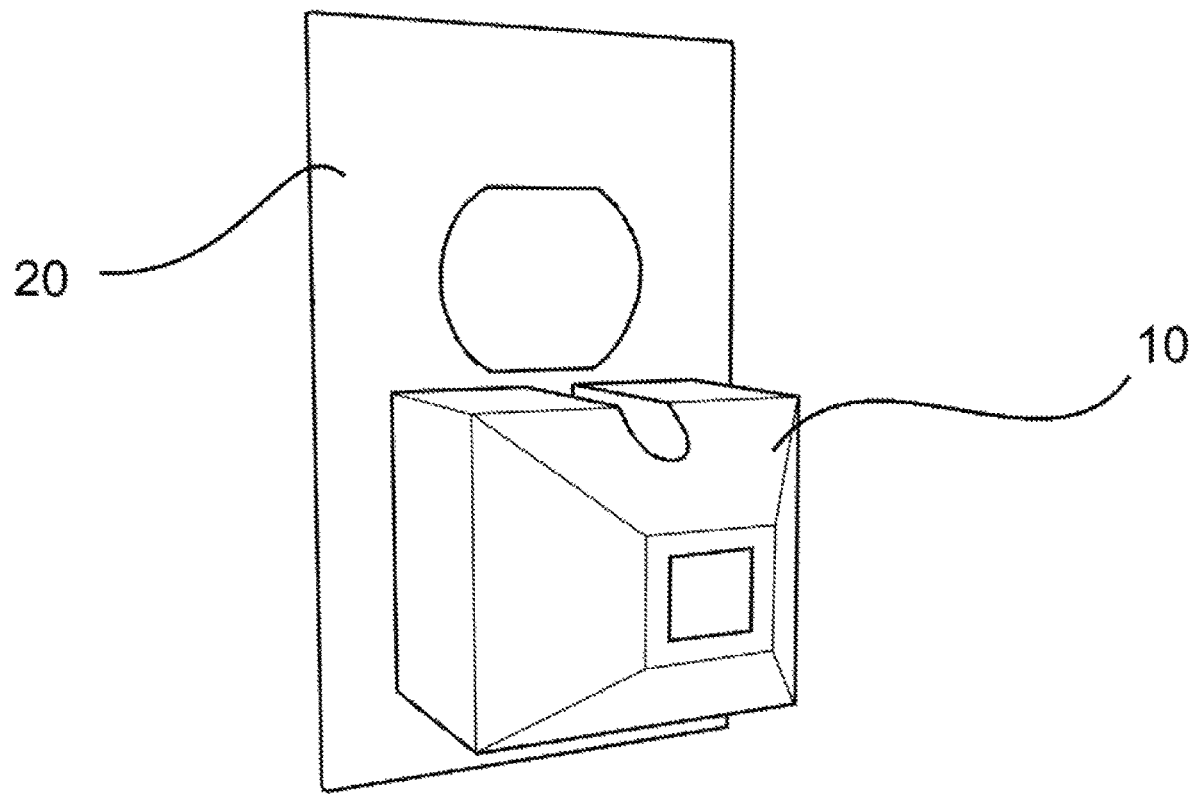
FIG. 1 depicts a view of the apparatus of the present invention as seen from the front.
Figure 2:
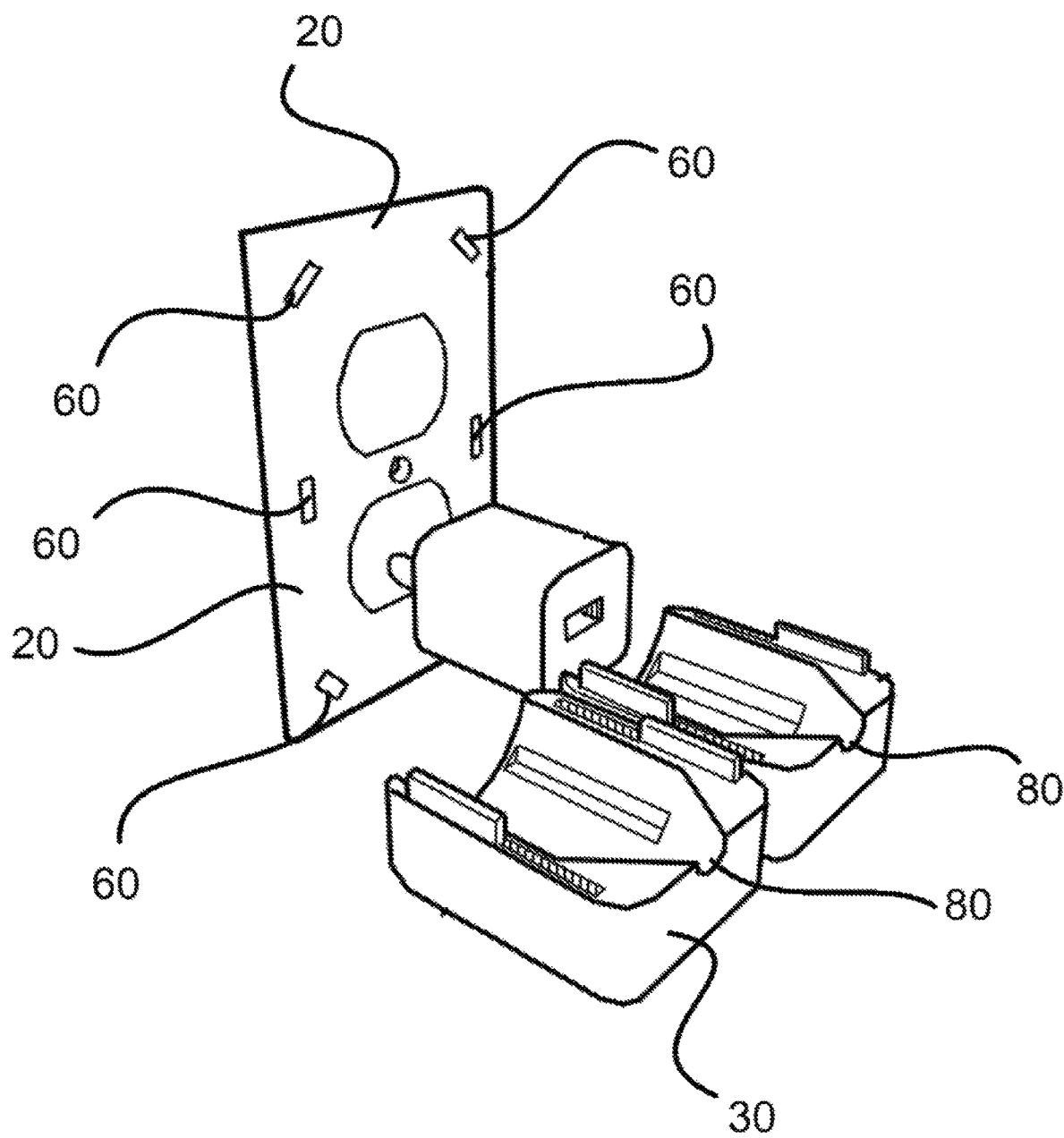
FIG. 2 exhibits a view of the apparatus of the present invention as seen from the top and side, detailing the inside of the sabot of the present invention.
Figure 3:
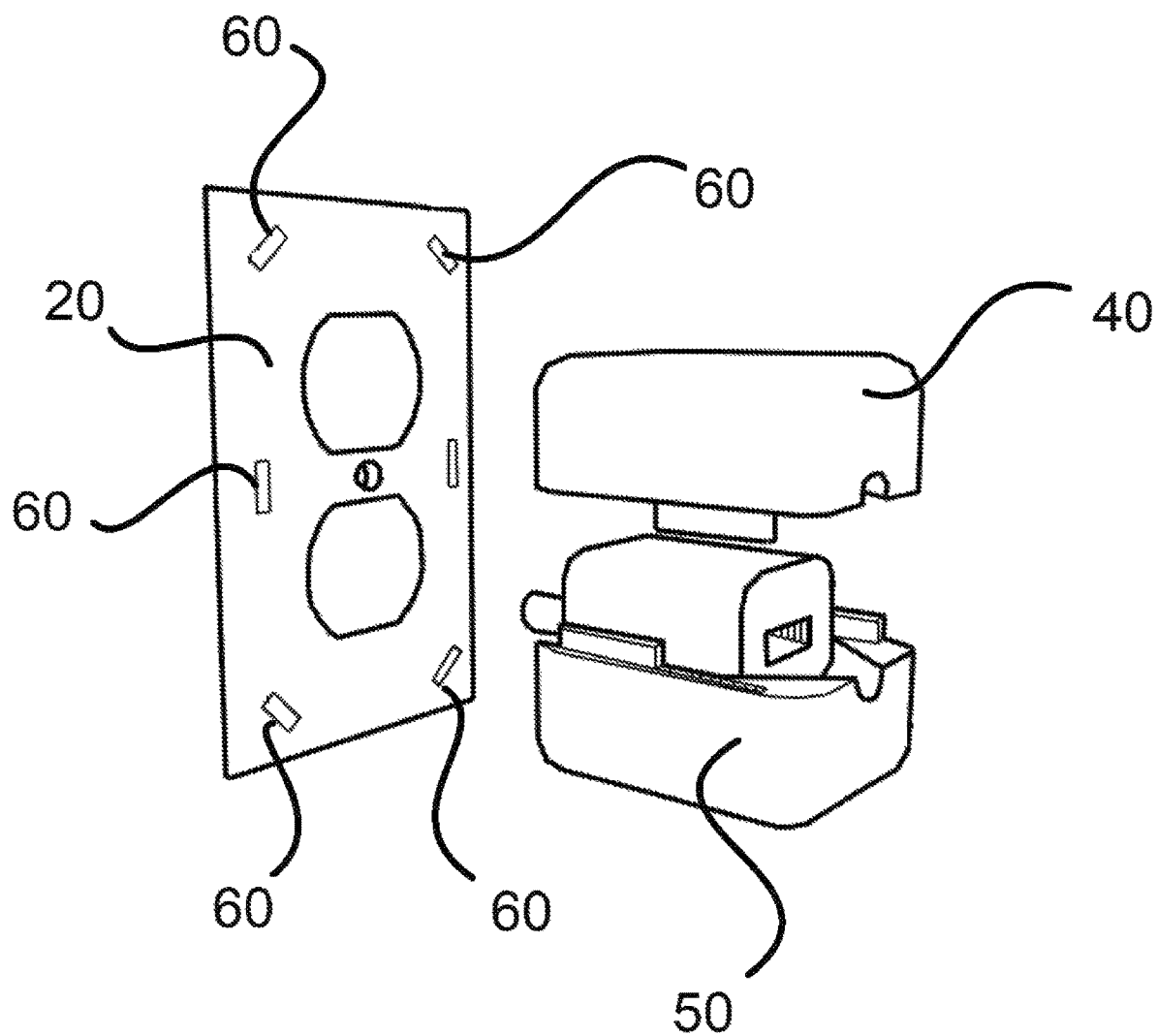
FIG. 3 shows the sabot of the present invention clamping around a mobile device charger.
Figure 4:
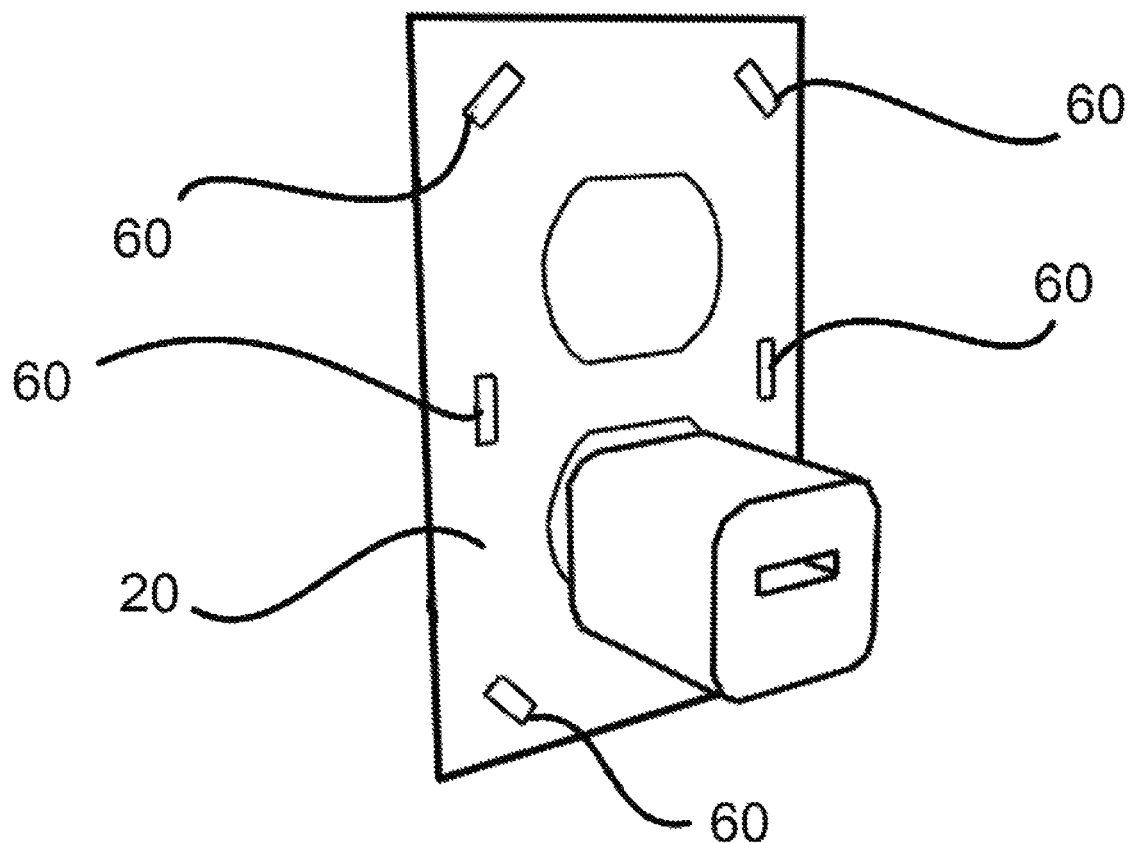
FIG. 4 exhibits the back plate of the present invention disposed in relation to a mobile device charger.
Figure 5:
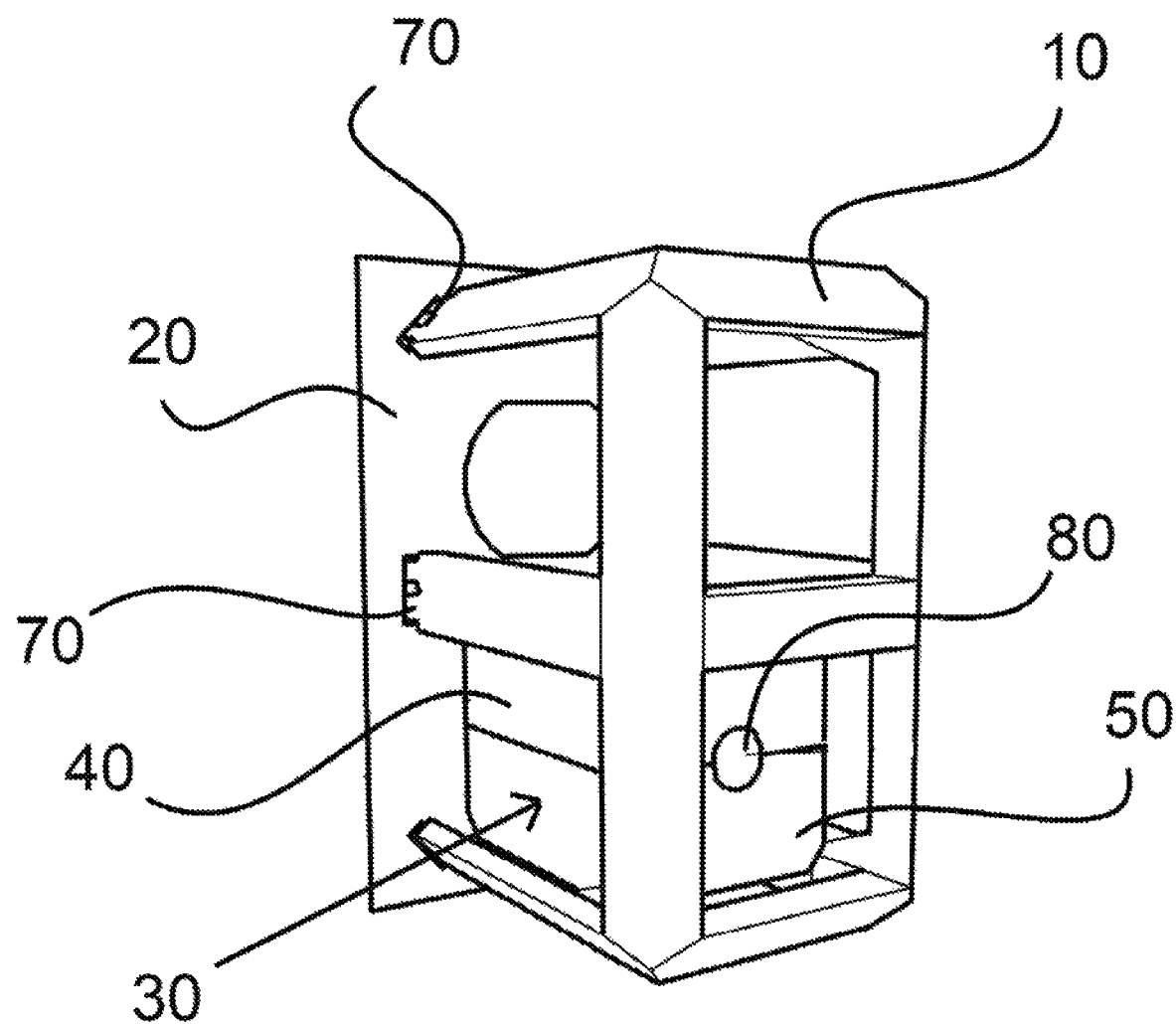
FIG. 5 depicts the retaining cradle disposed in relation to the sabot and the back plate of the present invention.
Figure 6:
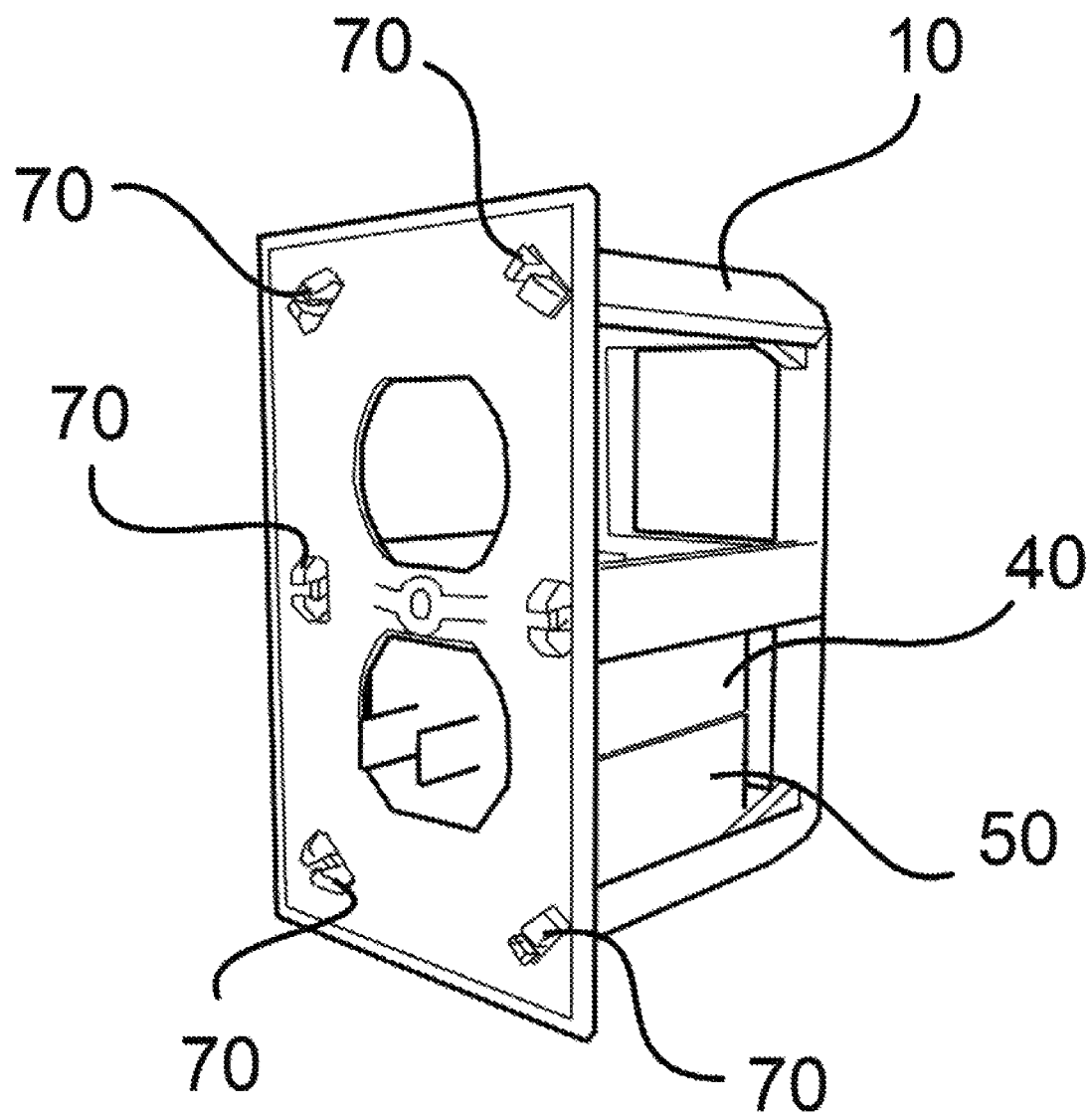
FIG. 6 depicts a view of the present invention as seen from the rear.

The present specification discloses one or more embodiments that incorporate the features of the invention. The disclosed embodiment(s) merely exemplify the invention. The scope of the invention is not limited to the disclosed embodiment(s).

References in the specification to "one embodiment," "an embodiment," "an example embodiment," etc., indicate that the embodiment described may include a particular feature, structure, or characteristic, but every embodiment may not necessarily include the particular feature, structure or characteristic. Moreover, such phrases are not necessarily referring to the same embodiment, Further, when a particular feature, structure, or characteristic is described in connection with an embodiment, it is submitted that it is within the knowledge of one skilled in the art to effect such feature, structure, or characteristic in connection with other embodiments whether or not explicitly described.

The present invention is a charger guard apparatus configured to protect and maintain a mobile device charger as well as any and all cables extending out and away from the mobile device charger. The preferred embodiment of the present invention is equipped with a retaining cradle (10), wall plate (20), and sabot (30). The sabot (30) is preferably fashioned of two mating halves, a top half (40) and a bottom half (50). The wall plate (20) is preferably equipped with clip sockets (60) disposed equidistantly around the perimeter of the wall plate (20). The retaining cradle (10) is preferably equipped with retaining clips (70) configured to interface with the clip sockets (60) of the wall plate (20) to ensure the retaining cradle (10) remains in position once installed.

It should be noted that the sabot (30), when assembled, exhibits a cavity which is equipped with adequate space to accommodate a variety of AC-powered mobile device chargers, AC/DC adapters, or plugs of conventional household devices. Similarly, it should be noted that the sabot (30) presents a groove (80) when the top half (40) and bottom half (50) are assembled together which facilitates the placement of at least one wire of the AC-powered device, such as a mobile device charging cable. The groove (80) is smaller than that of a conventional USB-A male plug.

The process of installation and use of the system and apparatus of the present invention, as shown in FIG. 7, is preferably as follows:
1. The user purchases the apparatus of the present invention from a retailer or e-retailer. (100)
2. The user unpackages the apparatus of the present invention and ensures all components are present. (110)
3. The user selects a location equipped with a wall-based AC outlet at which he/she wishes to maintain the presence of a mobile device charger or other AC-powered object. (120)
4. The user unscrews the default wall plate mounting screw, and removes the default wall place of the AC outlet. (130)
5. The user replaces the default wall plate with the included replacement wall plate equipped with the mounting slots of the present invention. (140)
6. The user employs the default wall plate mounting screw to mount the replacement wall plate to the AC outlet panel. (150)
7. The user inserts the desired AC-powered device plug, such as a mobile device charger, into the AC outlet. If necessary, a USB cable is also inserted into the AC-powered device in the event that the device is a mobile device charger configured to employ a USB-A based charging system. (160)
8. The user then encapsulates the AC-powered plug, including the charger and male portion of the USB cable with the included sabot. The two halves of the sabot are closed. (170)
9. The user then attaches the retaining cradle to the wall plate by inserting the clasps of the cradle into the slots of the wall plate. (180) The cradle preferably clicks into place once securely mounted to the wall plate.
10. The charger is now secured in position within the sabot, which is encased within the retaining cradle, ensuring that the device may not be unplugged without significant effort, thereby decreasing the likelihood of charger migration, damage, or loss. (190)

The preferred embodiment of the present invention is preferably fashioned of polypropylene, nylon, or a combination thereof. It should be understood that the present invention may be manufactured in a variety of colors, patterns, and textures as demand requires. Additionally, it should be understood that the apparatus of the present invention preferably exhibits a universal design capable of installation on a variety of electrical outlets which are compatible with a conventional wall plate. It is envisioned that at least one non-standard screw (hex, torx, star, etc.) may be bundled with the present invention to facilitate attachment of the replacement wall plate of the present invention to the outlet box, preferably exhibiting the same standardized threading conventionally found on outlet box hardware.

Alternate embodiments of the present invention preferably include, but are not limited to: a dual outlet charger guard, a single outlet charger guard, a GFCI outlet charger guard, and charger guards designed to vary in depth to accommodate differing types of AC devices employing differing sizes of AC/DC adapters or wall plugs.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

We claim:

1. A charger guard apparatus for the protection of AC household outlets, wall plate, and plugs of AC-powered devices comprising:
   a retaining cradle;
   a wall plate;
   a sabot, said sabot composed of a top half and a bottom half;
   wherein said top half and said bottom half are configured to interlock, forming a cavity;
   wherein said wall plate is equipped with clip sockets;
   wherein said clip sockets are disposed around a perimeter of said wall plate, spaced equidistantly apart;
   wherein said retaining cradle is equipped with retaining clips;
   wherein said cavity is spaced to accommodate the plug of AC-powered devices;
   wherein said retaining cradle is disposed around and in contact with said sabot; and
   wherein said clip sockets are configured to accept and restrain said retaining clips when said retaining cradle is disposed in communication with said wall plate.

2. The apparatus of claim 1, wherein said sabot exhibits a cavity equipped with space sufficient to accommodate an AC-powered mobile device charger.

3. The apparatus of claim 1, further comprising:
a groove, said groove disposed on said sabot, positioned at a juncture of said top half and said bottom half of said sabot.

4. The apparatus of claim 1, wherein said clip sockets are arranged equidistantly around a perimeter of said wall plate.

5. The apparatus of claim 1, wherein said retaining clips are disposed equidistantly around a perimeter of said retaining cradle.

6. The apparatus of claim 1, wherein said sabot is configured to encompass the plug of the AC powered device.

7. The apparatus of claim 6, wherein said wall plate replaces a default socket wall plate of the outlet.

8. The apparatus of claim 6, wherein said sabot exhibits a cavity equipped with space sufficient to accommodate AC-powered mobile device chargers.

9. The apparatus of claim 6, further comprising:
a groove, said groove disposed on said sabot, positioned at a juncture of said top half and said bottom half of said sabot.

10. The apparatus of claim 1, wherein said wall plate is configured to be a replacement for a default socket wall plate.

11. The apparatus of claim 10, wherein said clip sockets are arranged equidistantly around a perimeter of said wall plate.

12. The apparatus of claim 11, wherein said retaining clips are disposed equidistantly around a perimeter of said retaining cradle.

13. The apparatus of claim 12, wherein said retaining clips are configured to interlock with said clip sockets, securing said retaining cradle to said wall plate.

14. A charger guard apparatus for the protection of AC household outlets, wall plate, and plugs of AC-powered devices including mobile device chargers comprising:
an outer layer, said outer layer is a retaining cradle;
a middle layer, said middle layer is a sabot, said sabot composed of a top half and a bottom half;
an inner layer, said inner layer is a wall plate;
wherein said wall plate is equipped with clip sockets;
wherein said retaining cradle is equipped with retaining clips;
wherein said clip sockets are configured to accept and restrain said retaining clips when said retaining cradle is disposed in communication with said wall plate;
wherein said clip sockets are disposed around a perimeter of said wall plate, spaced equidistantly apart;
wherein said sabot is configured to encompass the plug of the AC powered device;
a cavity, said cavity disposed within said sabot when said top half is mated to said bottom half;
wherein said cavity exhibits adequate space to accommodate an AC-powered mobile device charger;
a groove, said groove disposed on said sabot, positioned at a juncture of said top half and said bottom half of said sabot;
wherein said retaining cradle is last disposed around and touching said sabot;
wherein said sabot is configured to close around the AC powered device plug; and
wherein said groove is configured to channel a wire of the mobile device charger.

\* \* \* \* \*